Patented July 21, 1953

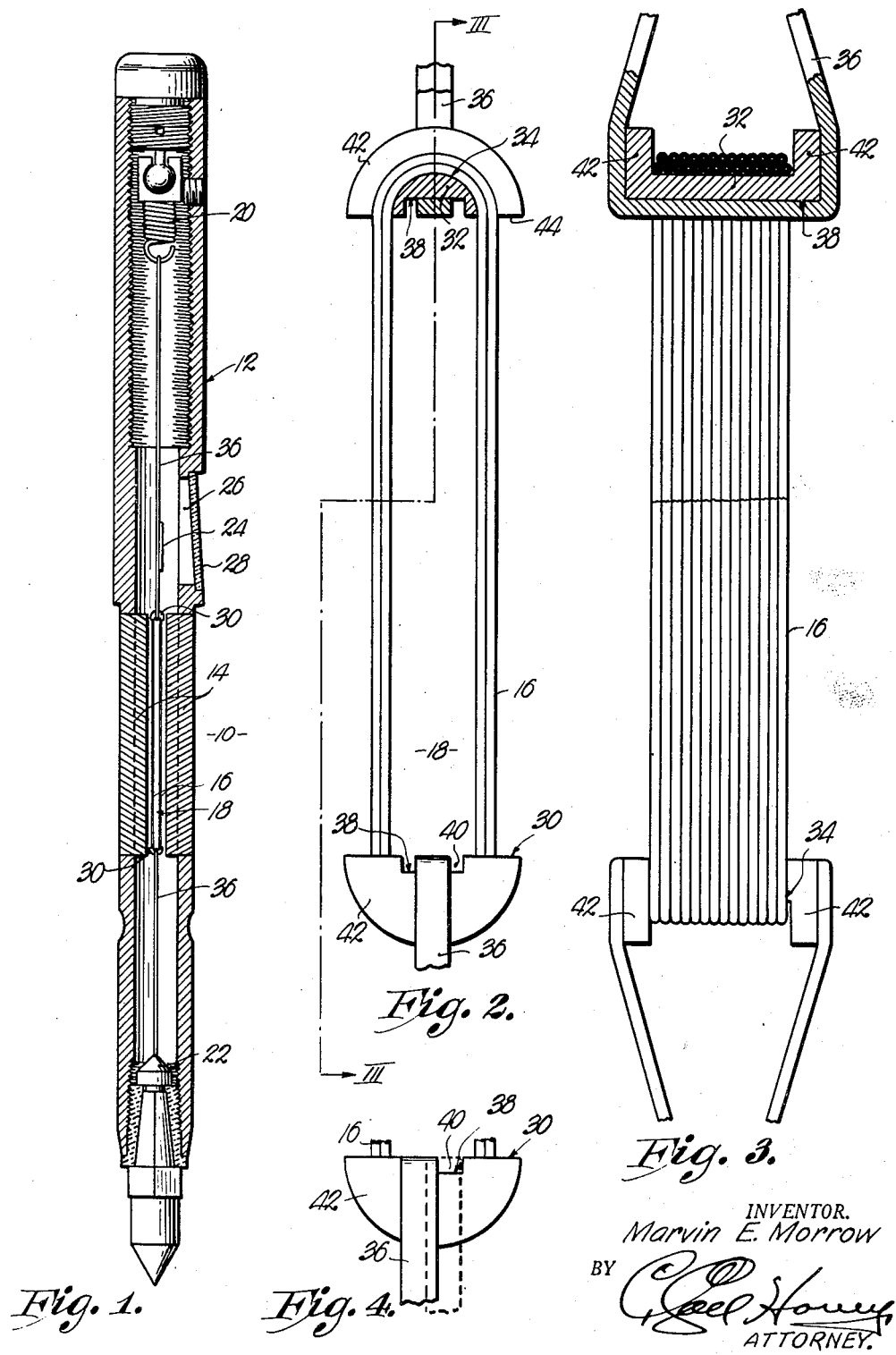

2,646,546

UNITED STATES PATENT OFFICE 2,646,546

GALVANOMETER HAVING BALANCED COIL ASSEMBLY

Marvin E. Morrow, Tulsa, Okla.

Application March 30, 1951, Serial No. 218,411

3 Claims. (Cl. 324—97)

This invention has to do with galvanometers and particularly with those used in seismograph cameras, the primary object being to improve upon the mounting for the coil thereof to permit perfect balancing of the coil both statically and dynamically.

End mountings for the coil of galvanometers used in seismograph oscillograph cameras conventionally take the form of a spool. The coil is wound about a pair of spaced spools and each spool receives a filament or ribbon through the bore thereof for suspending the entire vibratory assembly within a mounting tube therefor.

The vibrator assembly is disposed between a pair of magnetic poles and thereby subjected to flux acting upon the coil thereof. Accordingly, sensitivity of the galvanometer depends directly upon the form and construction of the vibratory assembly thereof. The entire instrument is extremely small and the vibratory assembly is, therefore, difficult to manufacture with the precision necessary to proper performance.

It is the most important object of the present invention to provide a galvanometer vibrator of reduced weight and having means of joining the coil thereof with the suspension ribbons to permit pre-adjustment and setting with absolute balance prior to final assembly and use.

Another object of this invention is to reduce the cost of galvanometers through improved steps of manufacture capable of producing accurate balance with minimum workman effort.

A further object hereof is to provide a semi-cylindrical end mounting for galvanometer coils, each having a flat innermost face for receiving its suspension filament, along which face the filament may be adjusted prior to final attachment to balance the coil perfectly.

Other equally important objects relate to details of construction, all of which will be made clear as the following specification progresses, reference being had to the accompanying drawing, wherein:

Figure 1 is a longitudinal, sectional view through a galvanometer for seismograph oscillograph cameras embodying the improved balanced coil assembly forming the subject matter of my present invention.

Fig. 2 is an enlarged, fragmentary, side elevational view of the coil assembly per se showing the same detached from associated parts of the galvanometer, parts being in section to reveal details of construction.

Fig. 3 is a cross-sectional view taken on irregular line III—III of Fig. 2 looking in the direction of the arrows; and Fig. 4 is a fragmentary, side elevational view of one end of the coil assembly illustrating the manner of adjustment of one of the suspension filaments.

Galvanometers for recording oscillographs or camera take various forms and one modification such as illustrated in Fig. 1 of the drawing is fully described in my co-pending application, Serial No. 184,156, filed September 11, 1950, this being a continuation in part of said co-pending case.

Briefly, galvanometer 10 shown in Fig. 1, may comprise an elongated tube 12 having a pair of opposed, spaced-apart magnetic poles 14 mounted therein between which a coil 16 of a vibratory assembly 18 is suspended for oscillatory rotation in response to magnetic flux passing between the poles 14. The means for suspending the assembly 18 within the tube 12 may be varied and for the present purposes, such mountings may comprise a spring 20 and its associated parts at one end of the tube 12 and a head 22 at the opposite end of tube 12.

A small mirror 24 is ordinarily carried by the vibratory assembly 18 to reflect a light beam upon a moving film (not shown) to record the oscillations of coil 16 as it responds to the passage of electrical currents therethrough. Accordingly, the tube 12 is provided with an opening 26 in alignment with the mirror 24 and preferably covered by a transparent panel 28.

As above indicated, the assembly 18 is of extremely minute dimensions and it is pointed out that Figs. 2 to 4 inclusive are magnified views of such assembly. Because of such relatively small size it is difficult to properly balance the assembly 18 within the tube 12 so as to render the coil 16 insensitive to mechanical vibrations.

In accordance with the form of my present invention therefore, coil 16 comprising a plurality of windings of extremely fine wire or other conductible material, is coiled about a pair of identical end mountings broadly designated by the numeral 30. Any suitable lightweight, but sturdy material may be used in making the mountings 30, but the shape thereof is highly important and to this extent it is seen that the same each comprise a semi-cylindrical portion 32 having a semi-circular, outermost face 34. It is upon these two faces 34 of elements 30—30 that the coil 16 is wound in the manner illustrated by Figs. 2 and 3 of the drawing. Coil 16 with its elements 30 is held in suspension between the poles 14 by a pair of substantially identical ribbon-like filaments 36, the uppermost of which, as shown in Fig. 1, carries the mirror 24 in any suitable fashion. The ribbons 36 are looped about the corresponding mounting element 30 in intersecting relationship or through the coil 18 and each bears against a flat, innermost surface 38 on the corresponding mounting element 30.

In the modification chosen for illustration, the flat surface 38 comprises the bottom wall of a notch 40 that is formed in the semi-cylindrical portion 32 of each element 30 respectively. It is to be understood however, that such notch 40 is provided solely to reduce the weight of the elements 30 and that the same may be eliminated if desired so long as a relatively flat, inner surface is presented for receiving filaments or looped ribbons 36. Accordingly, the flat surfaces 38 against which the ribbons 36 bear, are substantially parallel and appreciably wider than the width of the ribbons 36 as is clear in Figs. 2 and 4.

The ends of the mounting elements 30 are defined by a pair of spaced, semi-circular flanges 42 that extend laterally beyond the arcuate face 34 and terminate in a straight diametrical edge 44 aligned with the innermost extremities of semi-cylindrical portion 32.

Fig. 3 of the drawing illustrates clearly the way in which the flanges 42 serve to embrace the coil 16 at its two ends to hold the same in place upon the arcuate surfaces 34 and also illustrates the way the ribbons 36 flatly engage the surfaces 38 throughout the bight thereof. From the inner faces 38, the legs of the ribbons 36 extend outwardly beyond the coil 16 and bear flatly against the outer faces of the flanges 42 as is clear in Fig. 3 of the drawing.

By virtue of the fact that the ribbons 36 are permitted to lie flatly on the surfaces 38 and are not restricted in lateral movement with respect thereto, it is possible to shift the ribbons 36 with respect to their corresponding elements 30 in the manner illustrated in Fig. 4 of the drawing. Whether or not the ribbons 36 are to be positioned directly on the longitudinal axis of coil 16 or to one side thereof, will depend entirely upon the distribution of weight in the coil 16 and more particularly in the two elements 30.

It is virtually impossible to provide a pair of identical elements 30 and therefore, irregular weight distribution may occur at any point to cause an unbalance in the vibratory assembly 18, either statically or dynamically when the ribbons 36 are maintained in perfect alignment.

There are many methods of determining the balance of coils of this character now employed in this field and otherwise available for use, one of which includes spinning of the assembly 18 to determine the weight distribution thereof. Through use of such testing methods it is possible for the manufacturer to set the ribbons 36 with respect to the surfaces 38 and to thereby attain absolutely perfect balance both statically and dynamically.

It is contemplated that after the ribbons 36 have been adjusted laterally with respect to the surfaces 38 as illustrated in Fig. 4 of the drawing upon determination of the proper positioning thereof, they be secured against maladjustment with respect to the elements 30. The means of attachment of the ribbons 36 to the elements 30 forms no part of the present invention and may, if desired, constitute a suitable adhesive (not shown) joining the ribbons 36 to the surfaces 38.

A relatively light coating of adhesive material over the ribbons 36 at the bight thereof, and flowing along the edges to cover a portion of the surface 38 will suffice to hold the ribbons 36 against displacement.

It is seen from the foregoing that the provision of mounting means 30 eliminates a tremendous amount of weight considering the minute dimensions of the assembly 18 as compared with the conventional spool mounting commonly employed. Furthermore, the ribbons 36 bear against a flat surface 38 rather than against an arcuate face such as is true in the use of spools wherein the ribbon passes through the cylindrical bore of such spools. It is impossible to attain perfect balance when the suspension elements of the assembly cannot be shifted and have a tendency to curl along the arcuate surface of a cylindrical bore. Tests have proven that with a minimum amount of effort and time it is possible to provide galvanometers 10 having a vibratory assembly 18 that is extremely sensitive to magnetic flux changes between poles 14 when the assembly is made as herein provided.

In designing the vibratory assembly 18 the necessity for strength and rigidity has not been overlooked and while sensitivity has been increased tremendously to a point of virtual absolute perfection, the efficiency of the device from the standpoint of withstanding shock and other abuses, has not been depleted.

The degree of balance made possible by a galvanometer having a vibratory assembly made as above set forth becomes necessary because of new uses being made of instruments of this character in testing vibration, stress and strain in airborne frames and other industrial applications where the galvanometer is subjected to severe vibrations and yet must be extremely sensitive. Severe mechanical disturbances will not be reflected in rotary movement of the coil of the galvanometer forming the subject matter hereof and it will, thereby not be prevented from making a true record of any phenomena being photographed.

The importance of details of construction in a device of this character is now apparent but such changes and modifications as fairly come within the scope of the appended claims are manifestly contemplated hereby.

Having thus described the invention, what is claimed as new and desired to be secured by Letters Patent is:

1. In a vibratory assembly for galvanometers, a pair of spaced supports each having an arcuate outermost face and a flat innermost face; an elongated coil wound about the supports and engaging the arcuate faces; and an elongated, flat suspension ribbon looped about each support respectively through the coil in intersecting relationship thereto and in engagement with the flat faces, the width of said ribbons being less than the innermost width of the coil for rendering the ribbons shiftable with respect to the supports on the transverse axes of the ribbons and transversely of the longitudinal axis of the coil.

2. In a vibratory assembly for galvanometers as set forth in claim 1 wherein each support is provided with a notch, the said flat innermost faces of the supports comprising the bottom wall of the notches.

3. In a vibratory assembly for galvanometers as set forth in claim 1 wherein the supports are each provided with a pair of spaced-apart flanges on the arcuate faces thereof for confining the coil therebetween.

MARVIN E. MORROW.

References Cited in the file of this patent

UNITED STATES PATENTS

| Number | Name | Date |
| --- | --- | --- |
| 2,519,591 | Morrow | Aug. 22, 1950 |
| 2,550,720 | Richardson | May 1, 1951 |
| 2,596,019 | Fisher | May 6, 1952 |